US012591208B2

(12) United States Patent
Ji et al.

(10) Patent No.: US 12,591,208 B2
(45) Date of Patent: Mar. 31, 2026

(54) TIME DISPLAY METHOD, ELECTRONIC DEVICE, AND COMPUTER-READABLE STORAGE MEDIUM

(71) Applicant: VIVO MOBILE COMMUNICATION CO., LTD., Chang'an Dongguan (CN)

(72) Inventors: Wenbin Ji, Chang'an Dongguan (CN); Yun Chen, Chang'an Dongguan (CN); TikFan Chan, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 658 days.

(21) Appl. No.: 17/964,387

(22) Filed: Oct. 12, 2022

(65) Prior Publication Data

US 2023/0115445 A1 Apr. 13, 2023

Related U.S. Application Data

(63) Continuation of application No. PCT/CN2021/086155, filed on Apr. 9, 2021.

(30) Foreign Application Priority Data

Apr. 15, 2020 (CN) ........................ 202010295508.4

(51) Int. Cl.
*G04G 9/02* (2006.01)

(52) U.S. Cl.
CPC ..................................... *G04G 9/02* (2013.01)

(58) Field of Classification Search
None
See application file for complete search history.

(56) References Cited

U.S. PATENT DOCUMENTS 9,582,165 B2 * 2/2017 Wilson ................ G06F 3/04842
2013/0121119 A1 5/2013 Umamoto
(Continued)

FOREIGN PATENT DOCUMENTS

CN 106484272 A * 3/2017
CN 106550106 A 3/2017
(Continued)

OTHER PUBLICATIONS

Interactive clock: Telling time: Analog & Digital: Toy Theater. Toy Theater | Learn—Create—Play. (Nov. 17, 2018). https://web.archive.org/web/20190927041244/https://toytheater.com/clock/ Accessed Apr. 14, 2025 (Year: 2018).*
(Continued)

*Primary Examiner* — Regis J Betsch
*Assistant Examiner* — Michael James Walker
(74) *Attorney, Agent, or Firm* — BROOKS KUSHMAN P.C.

(57) ABSTRACT

The present invention provides a time display method and apparatus, and an electronic device. The time display method is applied to the electronic device, including: displaying a time dial, where the time dial includes a target pointer; and adjusting a display mode of the target pointer according to a first parameter of the electronic device, where the display mode of the target pointer includes at least one of the following: a color of the target pointer, a color filling amount of the target pointer, and a display attribute of a target element associated with the target pointer; and in a case that the display mode of the target pointer includes the display attribute of the target element, in a process of adjusting the display attribute of the target element, controlling a position relationship between the target element and the target pointer to remain unchanged.

20 Claims, 5 Drawing Sheets

(56) References Cited

U.S. PATENT DOCUMENTS

| | | | |
|---|---|---|---|
| 2016/0306442 A1 | 10/2016 | Lee et al. | |
| 2017/0046109 A1 | 2/2017 | Jung et al. | |
| 2017/0050305 A1 | 2/2017 | Birk | |
| 2017/0075305 A1 | 3/2017 | Ryu et al. | |
| 2019/0258208 A1 | 8/2019 | Essery | |
| 2019/0324404 A1* | 10/2019 | Olwal | G04B 45/0061 |
| 2019/0339860 A1 | 11/2019 | Chen et al. | |
| 2020/0218204 A1 | 7/2020 | Koh et al. | |
| 2020/0356242 A1 | 11/2020 | Wilson et al. | |

FOREIGN PATENT DOCUMENTS

| | | | |
|---|---|---|---|
| CN | 107920757 A | 4/2018 | |
| CN | 108345204 A | 7/2018 | |
| CN | 109991833 A | 7/2019 | |
| CN | 110716411 A | 1/2020 | |
| CN | 111402773 A | 7/2020 | |
| CN | 111522218 A | 8/2020 | |
| JP | S52-170077 U | 12/1977 | |
| JP | S57-14791 A | 1/1982 | |
| JP | H07-229976 A | 8/1995 | |
| KR | 20170050305 A * | 5/2017 | H04M 1/72519 |
| KR | 20180078355 A | 7/2018 | |
| WO | WO-2017003043 A1 * | 1/2017 | G04C 3/001 |

OTHER PUBLICATIONS

Eck, David J. Introduction to Computer Graphics, Section 1.1—Painting and Drawing, Hobart and William Smith Colleges—Retrieved via Archive.Org, Jul. 4, 2017, web.archive.org/web/20170704053416/https://math.hws.edu/graphicsbook/c1/s1.html. Accessed Apr. 15, 2025. (Year: 2017).*

Extended European Search Report dated Aug. 8, 2023 as received in Application No. 21789127.4.

JP Office Action dated Oct. 2, 2023 as received in Application No. 2022-554240.

CN Office Action dated Mar. 9, 2021 as received in Application No. 202010295508.4.

International Search Report and Written Opinion of the International Searching Authority dated Jun. 24, 2021 as received in Application No. PCT/CN2021/086155.

First Office Action for Korean Application No. 10-2022-7039804, dated May 24, 2024, 7 Pages.

First Indonesian Office Action for Indonesian Patent Application No. P00202212728 mailed Sep. 4, 2025. 5 pages.

* cited by examiner

TIME DISPLAY METHOD, ELECTRONIC DEVICE, AND COMPUTER-READABLE STORAGE MEDIUM

CROSS-REFERENCE TO RELATED APPLICATIONS

This application is a continuation application of International Application No. PCT/CN2021/086155 filed on Apr. 9, 2021, which claims priority to Chinese Patent Application No. 202010295508.4 filed on Apr. 15, 2020, which is incorporated herein by reference in its entirety.

TECHNICAL FIELD

The present disclosure relates to the field of display control technologies, and in particular, to a time display method and apparatus, and an electronic device.

BACKGROUND

As smart watches become increasingly popular, the demand for personalization becomes increasingly abundant. However, in the dial design of existing smart watches, an hour hand, a minute hand, and a second hand are only configured to represent current time information, and a display mode is usually fixed.

SUMMARY

According to a first aspect, an embodiment of the present invention provides a time display method, applied to an electronic device, and including:

- displaying a time dial, where the time dial includes a target pointer; and
- adjusting a display mode of the target pointer according to a first parameter of the electronic device, where
- the display mode of the target pointer includes at least one of the following: a color of the target pointer, a color filling amount of the target pointer, and a display attribute of a target element associated with the target pointer; and
- in a case that the display mode of the target pointer includes the display attribute of the target element, in a process of adjusting the display attribute of the target element, controlling a position relationship between the target element and the target pointer to remain unchanged.

According to a second aspect, an embodiment of the present invention provides a time display apparatus, applied to an electronic device, and including:

- a display module, configured to display a time dial, where time dial includes a target pointer;
- an adjusting module, configured to adjust a display mode of the target pointer according to a first parameter of the electronic device, where
- the display mode of the target pointer includes at least one of the following: a color of the target pointer, a color filling amount of the target pointer, and a display attribute of a target element associated with the target pointer; and
- in a case that the display mode of the target pointer includes the display attribute of the target element, in a process of adjusting the display attribute of the target element, control a position relationship between the target element and the target pointer to remain unchanged.

According to a third aspect, an embodiment of the present invention provides an electronic device, including a memory, a processor, and a computer program stored on the memory and executable on the processor, when the computer program is executed by the processor, the steps of the time display method as described above are implemented.

According to a fourth aspect, an embodiment of the present invention provides a computer-readable storage medium, storing a computer program, where when the computer program is executed by a processor, the steps of the time display method as described above are implemented.

DETAILED DESCRIPTION

To make the objectives, technical solutions, and advantages of the present invention clearer, the following describes the present invention in detail with reference to the accompanying drawings and specific embodiments.

For the problem that the dial design of a dial of the existing smart watch is fixed, the present invention provides a time display method and apparatus, and an electronic device.

Figure 1:
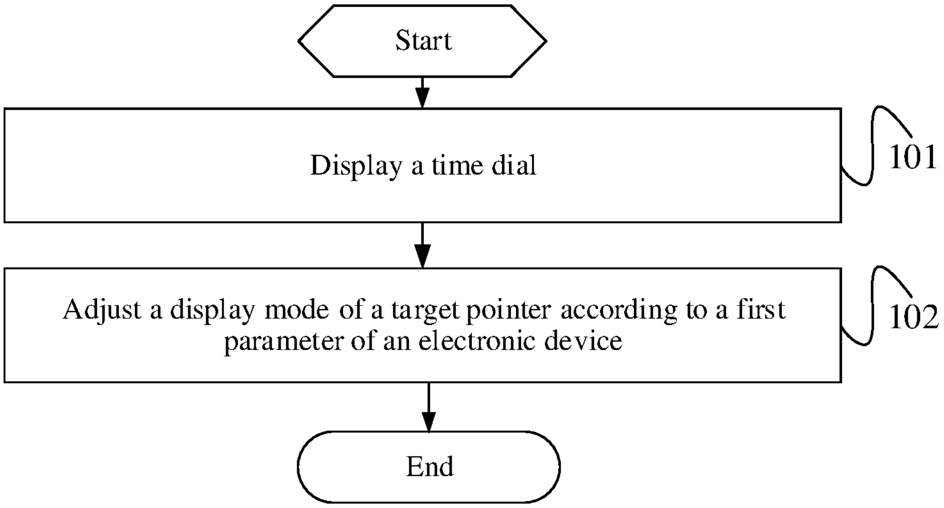
FIG. 1 is a schematic flowchart of a time display method according to an embodiment of the present invention.

As shown in FIG. 1, an embodiment of the present invention provides a time display method, applied to an electronic device, and including:

Step 101. Display a time dial, where the time dial includes a target pointer.

It should be noted that, the target pointer refers to, including but being not limited to, at least one of an hour hand, a minute hand, and a second hand displayed on the time dial.

Step 102. Adjust a display mode of the target pointer according to a first parameter of the electronic device.

It should be noted that, the first parameter refers to a parameter related to user information and the electronic device, and the first parameter is recorded/collected by the electronic device.

Figure 6:
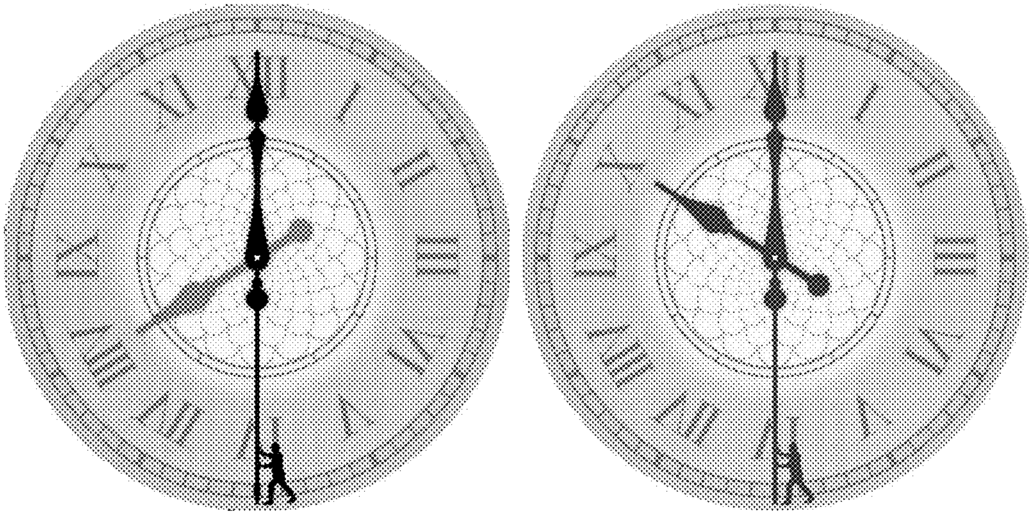
FIG. 6 is a schematic diagram of a change state of a target pointer.
Figure 7:
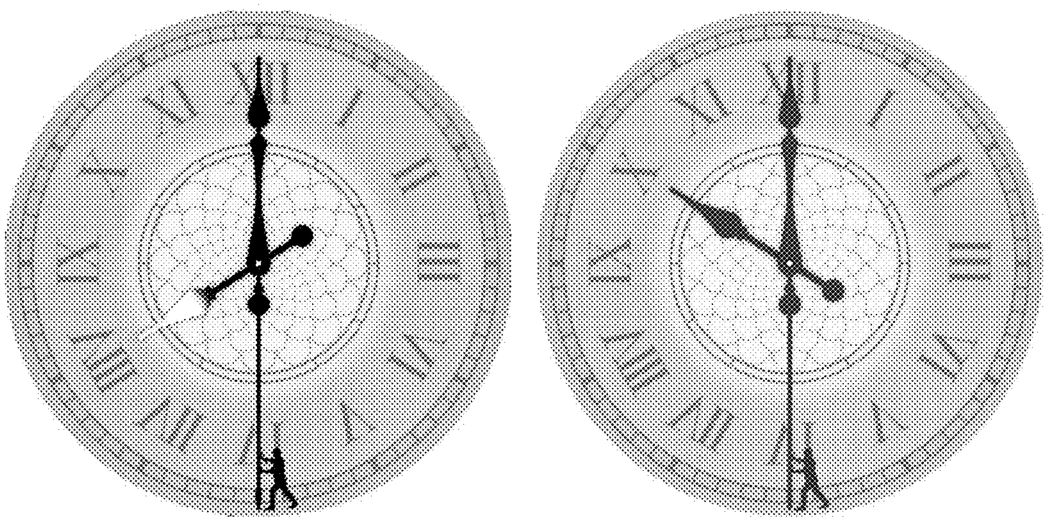
FIG. 7 is a schematic diagram of a change state of a target pointer.

In one embodiment, the display mode of the target pointer includes at least one of the following: a color of the target pointer (for example, as shown in FIG. 6), a color filling amount of the target pointer (for example, as shown in FIG. 7), and a display attribute of a target element associated with the target pointer. It should be noted that, the target element may be a control with a preset shape displayed on the time dial. For example, the control may be a virtual humanoid control, a virtual animal-shaped control, a virtual flower control, a virtual scenery control, or the like.

It should be noted that, the electronic device provided in this embodiment of the present invention may be a smart watch.

It should be noted that, in this embodiment of the present invention, the time dial including the target pointer is displayed on the electronic device, and the display mode of the target pointer is adjusted according to the first parameter of the electronic device, so as to implement the adjustment of the display mode of the pointer and enrich the display mode of the smart watch.

Further, it should be noted that, in a specific implementation of this embodiment of the present invention, the electronic device may adjust the same target pointer at the same moment, or may adjust different target pointers. For example, if the target element is associated with the second hand, when being implemented, step 102 may include: adjusting a color of the hour hand, and adjusting a display attribute of the target element associated with the second hand; or adjusting a color of the minute hand, adjusting a display attribute of the target element associated with the second hand, and adjusting a color filling amount of the hour hand; or adjusting a color of the second hand, and simultaneously adjusting a display attribute of the target element associated with the second hand.

It should be further noted that, in a case that the display mode of the target pointer includes the display attribute of the target element, in a process of adjusting the display attribute of the target element, a position relationship between the target element and the target pointer is controlled to remain unchanged.

Figure 2:
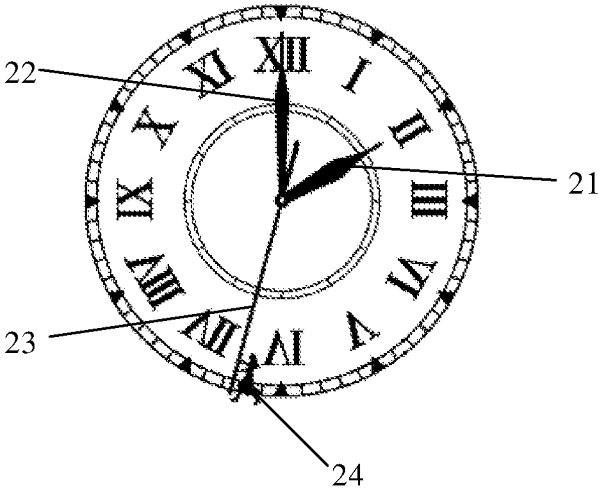
FIG. 2 is a schematic diagram of a display state of a time dial.

For example, as shown in FIG. 2, the time dial respectively displays an hour hand 21, a minute hand 22, and a second hand 23, and simultaneously displays a target element 24. The target element 24 is a virtual humanoid control.

It should be noted that, when there is a target element on the time dial, a position relationship between the target element and a pointer associated with the target element remains unchanged. In one embodiment, to implement the feature, the specific implementation of this embodiment of the present invention is as follows.

The target pointer is displayed at a first position, and the target element is displayed at a second position, where the first position and the second position have a preset position relationship (It should be noted that, for example, the preset position relationship is represented as maintaining a preset distance between the target pointer and the target element, and the preset distance is preset and stored in the electronic device); and in a case that a display position of the target pointer is updated to a third position, updating a display position of the target element to a fourth position, where the third position and the fourth position have the preset position relationship; and where in a case that the target element is displayed at the second position, a shape of the target element is a first preset shape; and in a case that the target element is displayed at the fourth position, a shape of the target element is a second preset shape, and the first preset shape is different from the second preset shape.

Further, it should be noted that, usually in this case, the target pointer refers to any one of the hour hand, the minute hand, and the second hand; and that is, in this case, the target element moves in the same direction with the target pointer, and a preset distance is always maintained between the target element and the target pointer.

Figure 3:
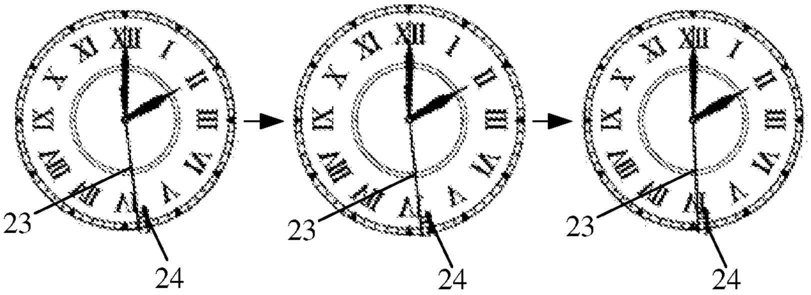
FIG. 3 is a schematic diagram of a change state between a target element and a pointer.

For example, as shown in FIG. 3, the target element 24 moves in the same direction with the second hand 23, that is, each time the second hand moves, the target element 24 also moves. When the target element 24 is a virtual humanoid control, FIG. 3 shows three different display positions of the virtual humanoid control, and postures of the virtual humanoid control at the three different display positions are different from each other. It should be noted that, in FIG. 3, the postures of the virtual humanoid control are a simulation of walking forms of the character.

It should be noted that, the implementation of controlling the position relationship between the target element and the target pointer to remain unchanged may maintain a relative position relationship between the target element and the target pointer, and increase the interest during the movement of the target element.

It should be further noted that, the display attribute of the target element includes: a form of the target element and/or a color of the target element.

For example, the electronic device may adjust the form of the target element according to the first parameter, may also adjust the color of the target element according to the first parameter, and may further adjust the form and the color of the target element according to the first parameter.

It should be noted that, by limiting the display attribute including the form of the target element and/or the color of the target element, when adjusting the display attribute of the target element associated with the target pointer according to the first parameter of the electronic device, the diversity of adjustment may be increased, and the interest of the display of the time dial may be enriched.

Further, it should be noted that, when the target element is a virtual humanoid control, a display region of the virtual humanoid control is adjacent to a display region of the target pointer. For example, when the target pointer is the minute hand, the display region of the virtual humanoid control is adjacent to a display region of the minute hand.

It should be noted that, the target element is limited to a virtual humanoid control, and the display region of the virtual humanoid control is set adjacent to the display region of the target pointer, so that the interest during the movement of the target pointer may be increased, and the diversity of the display of the time dial may be enriched.

In one embodiment, in this case, a specific implementation of step 102 in this embodiment of the present invention includes one of the following.

A11. Adjust a dressing part of the virtual humanoid control according to the first parameter of the electronic device; or A12. Adjust a posture of the virtual humanoid control according to the first parameter of the electronic device.

It should be noted that, the shape of the target element is changed in the foregoing implementations A11 and A12, which may be regarded as adjusting the form of the target element according to the first parameter of the electronic device.

A13. Adjust a color of the virtual humanoid control according to the first parameter of the electronic device.

It should be noted that, the implementation corresponds to the adjusting the color of the target element.

It should be noted that, different display attributes of the virtual humanoid control are adjusted according to the first parameter, so that the diversity of the adjustment is increased and the interest of the display of the time dial is enriched.

It should be noted that, because the content of the first parameter is different, the content adjusted by the electronic device is also different. For example, the following describes this embodiment of the present invention from the perspective of different first parameters.

In one embodiment, the first parameter of the electronic device includes at least one of the following: a time zone in which the electronic device is located, a time displayed by the electronic device, a global positioning system (GPS) region location of the electronic device, an ambient temperature of the electronic device, a user exercise mode monitored by the electronic device, and a user exercise duration monitored by the electronic device.

It should be noted that, the first parameter is limited, so that the electronic device may adjust different contents according to different parameters, thereby increasing the diversity of the adjustment.

Further, a specific implementation of step 102 includes:

B11. In a case that the first parameter of the electronic device includes a time zone in which the electronic device is located, display the target element according to a display attribute corresponding to the time zone.

Figure 8:
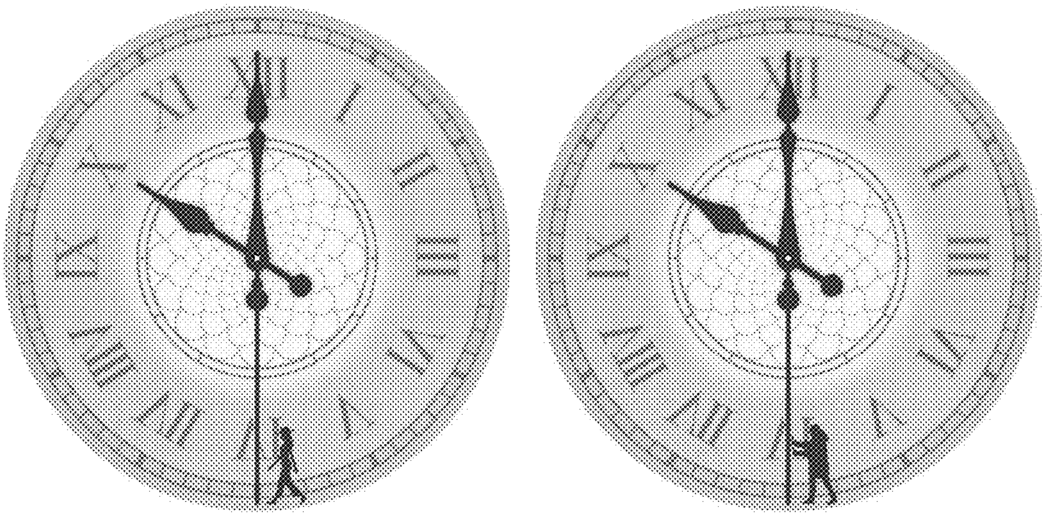
FIG. 8 is a schematic diagram of a change state of a target element.

It should be noted that, in the implementation, the display attribute of the target element is adjusted. For example, when the target element is a virtual humanoid control, and the display attribute is a dressing part of the virtual humanoid control, the electronic device adjusts the dressing part of the virtual humanoid control according to the display attribute corresponding to the time zone (for example, as shown in FIG. 8); for example, in GMT+8 time zone, and in Beijing in winter, the temperature is 10° C. In this case, the dressing part of the virtual humanoid control should be a down vest; and for the same time zone, in Shenzhen in winter, the temperature is 20° C., and the dressing part of the target element should be sportswear.

B12. In a case that the first parameter of the electronic device includes a user exercise mode monitored by the electronic device, display the target element according to a display attribute corresponding to the user exercise mode.

Figure 9:
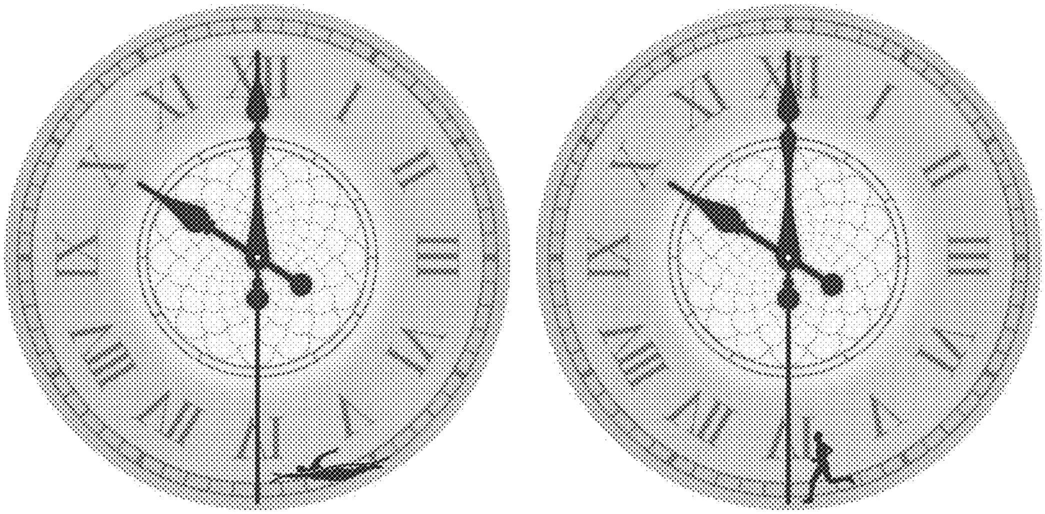
FIG. 9 is a schematic diagram of a change state of a target element.

It should be noted that, in the implementation, the display attribute of the target element is adjusted. For example, when the target element is a virtual humanoid control, and the display attribute is a posture of the virtual humanoid control, the electronic device adjusts the posture of the virtual humanoid control according to the display attribute corresponding to the user exercise mode (for example, as shown in FIG. 9); and for example, when it is detected that the user exercise mode is a running mode, a posture of the virtual humanoid control may be adjusted to a running posture, and when it is detected that the exercise mode is a swimming mode, a posture of the target element may be adjusted to a swimming posture.

B13. In a case that the first parameter of the electronic device includes a GPS region location of the electronic device, display the target element according to a display attribute corresponding to the GPS region location.

It should be noted that, in the implementation, the display attribute of the target element is adjusted. For example, when the target element is a virtual humanoid control, and the display attribute is a dressing part of the virtual humanoid control, the electronic device adjusts the dressing part of the virtual humanoid control according to the display attribute corresponding to the time zone; and for example, when the GPS region location is Africa, in this case, the dressing part of the virtual humanoid control should be a vest and a pair of shorts; and when the GPS region location is *Antarctica*, the dressing part of the target element should be a down jacket (for example, as shown in FIG. 8).

B14. In a case that the first parameter of the electronic device includes a user exercise duration monitored by the electronic device, adjust a color of the target pointer or a color filling amount of the target pointer according to the user exercise duration.

It should be noted that, when the color of the target pointer is adjusted, colors of the target pointer corresponding to the user exercise duration in different preset time ranges are different, and a preset time range is proportional to a color shade of the color of the target pointer; and that is, in this case, the longer the user exercise duration, the darker the color of the target pointer (for example, as shown in FIG. 6). For example, the target pointer is the minute hand. When the user usually exercises for 10 minutes, the color of the minute hand is orange. However, if the user exercises for 30 minutes, the pointer of the minute hand turns red to inform the user that the exercise duration is relatively long.

It should be noted that, when the color filling amount of the target pointer is adjusted, the color filling amount of the target pointer corresponding to different user exercise durations is different, and the exercise duration is proportional to the color filling amount of the target pointer (for example, as shown in FIG. 7); that is, in this case, with the gradual increase of the user exercise duration, the color filling amount of the target pointer is gradually adjusted. For example, when the user first starts exercising, the target pointer is not filled with color. If the user reaches a usual exercise target, the color of the target pointer is fully filled; and if the user exceeds the usual exercise target, the filling color of the target pointer is turned into a warning color to inform the user that the exercise is overdone today.

It should be noted that, in the implementation, the color and the color filling amount of different pointers may be respectively adjusted. For example, the color of the hour hand may be adjusted according to the user exercise duration, and the color filling amount of the minute hand may be adjusted according to the user exercise duration.

B15. In a case that the first parameter of the electronic device includes an ambient temperature of the electronic device, adjust the color of the target pointer or the color filling amount of the target pointer according to a value of the ambient temperature.

It should be noted that, when the color of the target pointer is adjusted, colors of the target pointer corresponding to ambient temperatures in different preset temperature ranges are different, and a preset temperature range is proportional to a color shade of the color of the target pointer; and that is, in this case, the higher the ambient temperature, the darker the color of the target pointer for example, as shown in FIG. 6). For example, the target pointer is the hour hand. When the ambient temperature is 15° C., the color of the hour hand is orange, but if the ambient temperature is 30° C., the hour hand turns red.

It should be noted that, when the color filling amount of the target pointer is adjusted, the color filling amount of the target pointer corresponding to different ambient temperatures is different, and the ambient temperature is proportional to the color filling amount of the target pointer (for example, as shown in FIG. 7); and that is, in this case, with the gradual increase of the ambient temperature, the color filling amount of the target pointer is gradually increased.

It should be noted that, in the implementation, the color and color filling amount of different pointers may be respectively adjusted. For example, the color of the hour hand may be adjusted according to the ambient temperature, and the color filling amount of the minute hand may be adjusted according to the ambient temperature.

For example, when the first parameter includes: at least one of the time zone in which the electronic device is located, the GPS region location of the electronic device, and the ambient temperature of the electronic device, the electronic device mainly adjusts the dressing part of the virtual humanoid control, for example, adjusts the dressing part of the virtual humanoid control according to the time in different time zones. For example, in GMT+8 time zone, and in Beijing in winter, the temperature is 10° C. In this case, the dressing of the target element should be a down vest; and for the same time zone, in Shenzhen in winter, the temperature is 20° C., and the dressing of the target element should be sportswear. When the first parameter includes the user exercise mode monitored by the electronic device, the electronic device may adjust the posture of the virtual humanoid control, and may also adjust the dressing part of the virtual humanoid control. It should be noted that, the user exercise mode is mainly determined by exercise parameters of the user collected by the electronic device. For example, when detecting that the exercise mode is a running mode, the electronic device may adjust a dressing part of the virtual humanoid control to sportswear such as sports shorts, and when detecting that the exercise mode is a swimming mode, the electronic device may adjust a posture of the virtual humanoid control to a swimming posture.

It should be noted that, by adjusting the display modes of different target pointers for different first parameters, the diversity of the display of the time dial is enriched, and the user experience is improved.

It should be noted that, the adjustment to the color and the color filling amount of the pointer and the display attribute of the target element associated with the pointer may be implemented separately or in combination. For example, the electronic device may simultaneously implement the adjustment of the color and the color filling amount of the pointer, and may also simultaneously implement the adjustment of the color and the color filling amount of the pointer and the display attribute of the target element associated with the pointer.

Specific applications of this embodiment of the present invention are described as follows.

For example, when there is one target pointer, the target pointer may be any one of the hour hand, the minute hand, and the second hand. For example, when the target pointer is the minute hand, the target element is associated with the minute hand, and the position relationship between the target element and the minute hand remains unchanged, and the electronic device may adjust the form of the target element and/or the color of the target element according to the first parameter. For example, when the target element is a virtual humanoid control, the virtual humanoid control is associated with the minute hand, and the position relationship between the virtual humanoid control and the minute hand remains unchanged. The electronic device may adjust the dressing part, the posture, and/or the color of the virtual humanoid control according to the first parameter; and in addition, the electronic device may further adjust the color or the color filling amount of the minute hand according to the first parameter.

Figure 10:
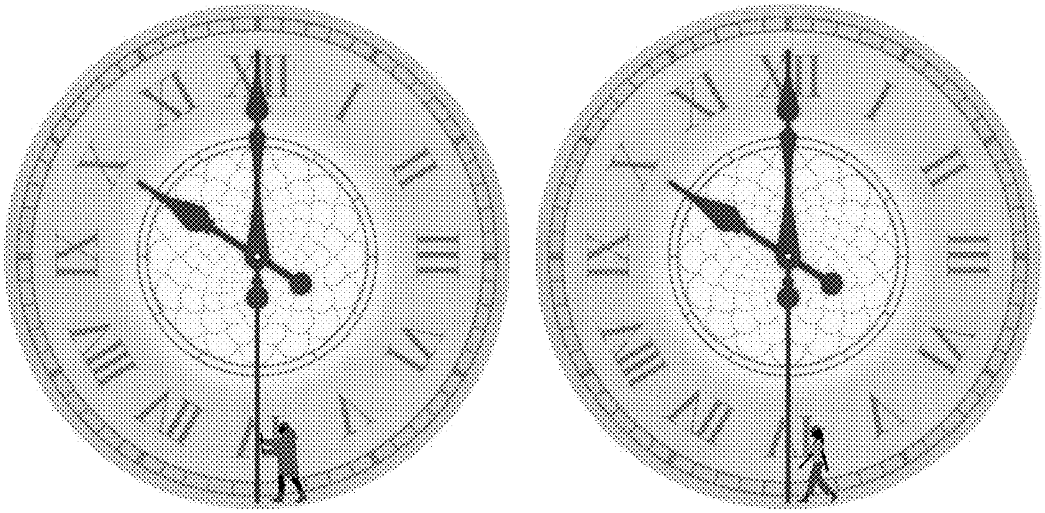
FIG. 10 is a schematic diagram of a change state of a target element.

For example, when there are two target pointers, the target pointers may be any two of the hour hand, the minute hand, and the second hand. For example, when the target pointers are the minute hand and the second hand, the target element is associated with the second hand, and the position relationship between the target element and the second hand remains unchanged, and the electronic device may adjust the form of the target element and/or the color of the target element according to the first parameter. For example, when the target element is a virtual humanoid control, the virtual humanoid control is associated with the second hand, and the position relationship between the virtual humanoid control and the second hand remains unchanged. The electronic device may adjust the dressing part, the posture, and/or the color of the virtual humanoid control according to the first parameter (for example, as shown in FIG. 10); and in addition, the electronic device may further adjust the color or the color filling amount of the minute hand according to the first parameter, or the electronic device may adjust the color of the minute hand and adjust the color filling amount of the second hand according to the first parameter, or the electronic device may adjust the color of the second hand and adjust the color filling amount of the minute hand according to the first parameter.

For example, when there are three target pointers, the target pointers are the hour hand, the minute hand, and the second hand. For example, the target element is associated with the second hand, the position relationship between the target element and the second hand remains unchanged, and the electronic device may adjust the form of the target element and/or the color of the target element according to the first parameter. For example, when the target element is a virtual humanoid control, the virtual humanoid control is associated with the second hand, and the position relationship between the virtual humanoid control and the second hand remains unchanged. The electronic device may adjust the dressing part, the posture, and/or the color of the virtual humanoid control according to the first parameter; and in addition, the electronic device may further adjust the color of the minute hand and the hour hand according to the first parameter, or the electronic device may further adjust the color filling amount of the minute hand and the hour hand according to the first parameter; or the electronic device may adjust the color of the second hand and the minute hand according to the first parameter, and adjust the color filling amount of the hour hand; or the electronic device may adjust the color of the second hand and the hour hand according to the first parameter, and adjust the color filling amount of the minute hand; or the electronic device may adjust the color filling amount of the second hand and the minute hand according to the first parameter, and adjust the color of the hour hand; or the electronic device may adjust the color filling amount of the second hand and the hour hand and adjust the color of the minute hand according to the first parameter.

It should be noted that, in the implementation of this embodiment of the present invention, adjustment of the display mode of the pointer on the time dial is implemented, and the display mode of the smart watch is enriched, so that the display of the time dial forms a coordinated relationship between user information and related parameters of the electronic device, which increases the interest of the smart watch and improves the user experience of the smart watch.

Figure 4:
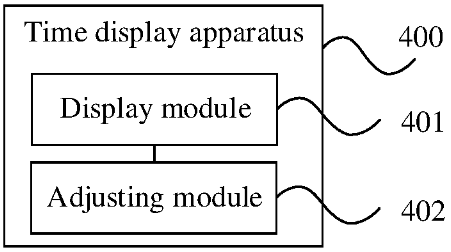
FIG. 4 is a schematic diagram of a module of a time display apparatus according to an embodiment of the present invention.

As shown in FIG. 4, an embodiment of the present invention further provides a time display apparatus 400, applied to an electronic device, and including:

a display module 401, configured to display a time dial, where time dial includes a target pointer; and an adjusting module 402, configured to adjust a display mode of the target pointer according to a first parameter of the electronic device, where the display mode of the target pointer includes at least one of the following: a color of the target pointer, a color filling amount of the target pointer, and a display attribute of a target element associated with the target pointer; and in a case that the display mode of the target pointer includes the display attribute of the target element, in a process of adjusting the display attribute of the target element, control a position relationship between the target element and the target pointer to remain unchanged.

In one embodiment, the controlling a position relationship between the target element and the target pointer to remain unchanged includes:

displaying the target pointer at a first position, and displaying the target element at a second position, where the first position and the second position have a preset position relationship; and in a case that a display position of the target pointer is updated to a third position, updating a display position of the target element to a fourth position, where the third position and the fourth position have the preset position relationship; and where in a case that the target element is displayed at the second position, a shape of the target element is a first preset shape; and in a case that the target element is displayed at the fourth position, a shape of the target element is a second preset shape, and the first preset shape is different from the second preset shape.

In one embodiment, the display attribute of the target element includes: a form of the target element and/or a color of the target element.

In one embodiment, the first parameter of the electronic device includes at least one of the following: a time zone in which the electronic device is located, a time displayed by the electronic device, a global positioning system GPS region location of the electronic device, an ambient temperature of the electronic device, a user exercise mode monitored by the electronic device, and a user exercise duration monitored by the electronic device.

In one embodiment, the adjusting module 402 is further configured to:

in a case that the first parameter of the electronic device includes a time zone in which the electronic device is located, display the target element according to a display attribute corresponding to the time zone;

in a case that the first parameter of the electronic device includes a user exercise mode monitored by the electronic device, display the target element according to a display attribute corresponding to the user exercise mode;

in a case that the first parameter of the electronic device includes a GPS region location of the electronic device, display the target element according to a display attribute corresponding to the GPS region location;

in a case that the first parameter of the electronic device includes a user exercise duration monitored by the electronic device, adjust the color of the target pointer or the color filling amount of the target pointer according to the user exercise duration; and in a case that the first parameter of the electronic device includes an ambient temperature of the electronic device, adjust the color of the target pointer or the color filling amount of the target pointer according to a value of the ambient temperature.

In one embodiment, the target element is a virtual humanoid control, and a display region of the virtual humanoid control is adjacent to a display region of the target pointer.

In one embodiment, the adjusting module 402 is further configured to:

adjust a dressing part of the virtual humanoid control according to the first parameter of the electronic device; or adjust a posture of the virtual humanoid control according to the first parameter of the electronic device; or adjust a color of the virtual humanoid control according to the first parameter of the electronic device.

The time display apparatus provided in this embodiment of the present invention may implement the processes implemented by the electronic device in the method embodiment of FIG. 1. To avoid repetition, details are not described herein again. In the time display apparatus of this embodiment of the present invention, the time dial including the target pointer is displayed on the electronic device, and the display mode of the target pointer is adjusted according to the first parameter of the electronic device, so as to implement the adjustment of the display mode of the pointer and enrich the display mode of the smart watch.

Figure 5:
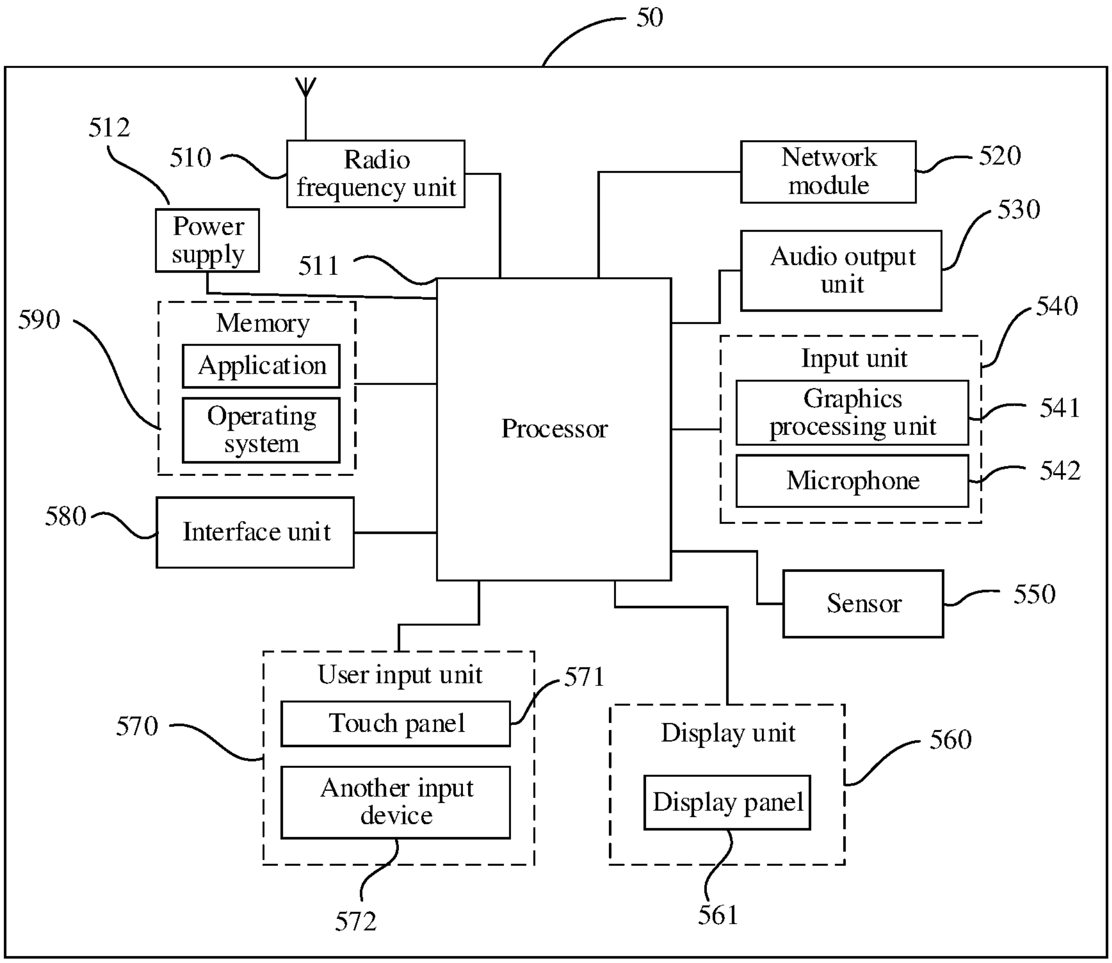
FIG. 5 is a block diagram of an electronic device according to an embodiment of the present invention.

FIG. 5 is a schematic diagram of a hardware structure of an electronic device for implementing an embodiment of the present invention.

An electronic device 50 includes, but is not limited to, components such as a radio frequency unit 510, a network module 520, an audio output unit 530, an input unit 540, a sensor 550, a display unit 560, a user input unit 570, an interface unit 580, a memory 590, a processor 511, and a power supply 512. A person skilled in the art may understand that the electronic device structure shown in FIG. 5 does not constitute a limitation to the electronic device. The electronic device may include more or fewer components than those shown in the figure, or some components may be combined, or a different component deployment may be used. In this embodiment of the present invention, the electronic device includes, but is not limited to, a mobile phone, a tablet computer, a notebook computer, a palmtop computer, an in-vehicle electronic device, a wearable device, a pedometer, and the like.

The processor 511 is configured to display a time dial through the display unit 560, where time dial includes a target pointer; adjust a display mode of the target pointer according to a first parameter of the electronic device, where the display mode of the target pointer includes at least one of the following: a color of the target pointer, a color filling amount of the target pointer, and a display attribute of a target element associated with the target pointer; and in a case that the display mode of the target pointer includes the display attribute of the target element, in a process of adjusting the display attribute of the target element, control a position relationship between the target element and the target pointer to remain unchanged.

In the electronic device of this embodiment of the present invention, the time dial including the target pointer is displayed on the electronic device, and the display mode of the target pointer is adjusted according to the first parameter of the electronic device, so as to implement the adjustment of the display mode of the pointer, and enrich the display mode of the smart watch.

It should be understood that, in this embodiment of the present invention, the radio frequency unit 510 may be configured to send and receive a signal during an information receiving and sending process or a call process. In one embodiment, the radio frequency unit receives downlink data from a base station, then delivers the downlink information to the processor 511 for processing; and in addition, sends related uplink data to the base station. Generally, the radio frequency unit 510 includes, but is not limited to, an antenna, at least one amplifier, a transceiver, a coupler, a low noise amplifier, a duplexer, and the like. In addition, the radio frequency unit 510 may further communicate with the network and another device through wireless communication systems.

The electronic device provides wireless broadband Internet access for a user by using the network module 520, for example, helps the user to send and receive an email, browse a webpage, and access stream media, and the like.

An audio output unit 530 may convert audio data received by the radio frequency unit 510 or the network module 520 or stored in a memory 590 into an audio signal and output as sound. In addition, the audio output unit 530 may further provide an audio output that is related to a particular function executed by the electronic device 50 (for example, a call signal receiving sound or a message receiving sound). The audio output unit 530 includes a speaker, a buzzer, a receiver, and the like.

An input unit 540 is configured to receive an audio signal or a video signal. The input unit 540 may include a graphics processing unit (Graphics Processing Unit, GPU) 541 and a microphone 542. The GPU 541 processes image data of a static picture or a video acquired by an image capturing device (for example, a camera) in a video capturing mode or an image capturing mode. An image frame that has been processed may be displayed on a display unit 560. The image frame processed by the GPU 541 may be stored on the memory 590 (or another storage medium) or sent through the radio frequency unit 510 or the network module 520. The microphone 542 may receive sound and may process such sound into audio data. The processed audio data may be transferred, in a phone talk mode, to a format that may be sent to a mobile communication base station via the radio frequency unit 510 to output.

The electronic device 50 may further include at least one sensor 550, such as an optical sensor, a motion sensor, and other sensors. In one embodiment, the optical sensor includes an ambient light sensor and a proximity sensor, where the ambient light sensor may adjust luminance of the display panel 561 according to the luminance of the ambient light, and the proximity sensor may switch off the display panel 561 and/or backlight when the electronic device 50 is moved to the ear. As one type of motion sensor, an acceleration sensor may detect magnitude of accelerations in various directions (which generally are triaxial), may detect magnitude and a direction of the gravity when static, and may be configured to identify an electronic device attitude (such as switchover between horizontal and vertical screens, a related game, and attitude calibration of a magnetometer), a related function of vibration identification (such as a pedometer and a knock); and the sensor 550 may further include a fingerprint sensor, a pressure sensor, an iris sensor, a molecular sensor, a gyroscope, a barometer, a hygrometer, a thermometer, an infrared sensor, etc., which are not be repeated herein.

The display unit 560 may be configured to display information input by the user or information provided for the user. The display unit 56 may include a display panel 561. The display panel 561 may be configured by using a liquid crystal display (Liquid Crystal Display, LCD), an organic light-emitting diode (Organic Light-Emitting Diode, OLED), or the like.

A user input unit 570 may be configured to: receive input numeral or character information, and generate a key signal input related to a user setting and function control of the electronic device. In one embodiment, the user input unit 570 includes a touch panel 571 and another input device 572. The touch panel 571, also referred to as a touchscreen, may collect a touch operation of a user on or near the touch panel (such as an operation of a user on or near the touch panel 571 by using any suitable object or attachment, such as a finger or a stylus). The touch panel 571 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and transmits the touch point coordinates to the processor 511. Moreover, the touch controller may receive and execute a command transmitted from the processor 511. In addition, the touch panel 571 may be implemented by using various types, such as a resistive type, a capacitance type, an infrared type, and a surface acoustic wave type. In addition to the touch panel 571, the user input unit 570 may further include the another input device 572. In one embodiment, the another input device 572 may include, but is not limited to, a physical keyboard, a functional key (such as a volume control key or a switch key), a track ball, a mouse, and a joystick, which are not repeated herein.

Further, the touch panel 571 may cover the display panel 561. After detecting a touch operation on or near the touch panel 571, the touch panel transfers the touch operation to the processor 511, to determine a type of a touch event. Then, the processor 511 provides a corresponding visual output on the display panel 561 according to the type of the touch event. Although, in FIG. 5, the touch panel 571 and the display panel 561 are used as two separate parts to implement input and output functions of the electronic device, in some embodiments, the touch panel 571 and the display panel 561 may be integrated to implement the input and output functions of the electronic device, which are not limited herein.

The interface unit 580 is an interface for connecting an external apparatus to the electronic device 50. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 580 may be configured to receive an input (such as data information or electric power) from an external apparatus and transmit the received input to one or more elements in the electronic device 50 or may be configured to transmit data between the electronic device 50 and an external apparatus.

The memory 590 may be configured to store a software program and various data. The memory 590 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 590 may include a high-speed random access memory, and may also include a nonvolatile memory, for example, at least one magnetic disk storage device, a flash memory, or another volatile solid-state storage device.

The processor 511 is a control center of the electronic device, and connects various parts of the entire electronic device by using various interfaces and lines. By running or executing the software program and/or module stored in the memory 590, and invoking data stored in the memory 590, the processor 511 performs various functions of the electronic device and processes data, thereby performing overall monitoring on the electronic device. The processor 511 may include one or more processing units; and in one embodiment, the processor 511 may integrate an application processor and a modem processor. The application processor mainly processes an operating system, a user interface, an application program, and the like. The modem processor mainly processes wireless communication. It may be understood that the foregoing modem may either not be integrated into the processor 511.

The electronic device 50 may further include the power supply 512 (such as a battery) for supplying power to the components. In one embodiment, the power supply 512 may logically connect to the processor 511 by using a power supply management system, thereby implementing functions, such as charging, discharging, and power consumption management, by using the power supply management system.

In addition, the electronic device 50 includes some unshown functional modules, which is not repeated herein.

In one embodiment, the embodiments of the present invention further provide an electronic device, including a processor 511, a memory 590, and a computer program on the memory 590 and executed on the processor 511, where when executed by the processor 511, the computer program implements the processes of the embodiment of the time display method, and may achieve the same technical effects. To avoid repetition, details are not described herein again.

The embodiments of the present invention further provide a computer-readable storage medium, storing a computer program, where when the computer program is executed by a processor, the processes of the embodiment of the time display method are implemented, and the same technical effects may be achieved. To avoid repetition, details are not described herein again. The computer-readable storage medium may include a flash drive, a read-only memory (Read-Only Memory, ROM), a random access memory (Random Access Memory, RAM), a magnetic disk, or an optical disc.

It should be noted that, the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses.

Through the foregoing description on the implementations, a person skilled in the art may clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present invention essentially, or the part contributing to the prior art, may be presented in the form of a software product. The computer software product is stored in a storage medium (for example, a ROM/RAM, a magnetic disk, or an optical disc) including several instructions to enable an electronic device (which may be a mobile phone, a computer, a server, an air conditioner, a network device, or the like) to perform the methods described in the embodiments of the present invention.

The foregoing descriptions are exemplary implementations of the present invention. It should be noted that a person of ordinary skill in the art may make certain improvements or polishing without departing from the principle of the present invention and the improvements or polishing shall fall within the protection scope of the present invention.

What is claimed is:

1. A time display method, applied to an electronic device, the method comprising:

displaying a time dial, wherein the time dial comprises a target pointer; and adjusting a display mode of the target pointer according to a first parameter of the electronic device, wherein the display mode of the target pointer comprises a display attribute of a target element associated with the target pointer; and each time the target pointer moves, the target element also moves in the same direction with the target pointer;

in a process of adjusting the display attribute of the target element, controlling a position relationship between the target element and the target pointer to remain unchanged;

wherein the display attribute of the target element comprises: a form of the target element and/or a color of the target element.

2. The time display method according to claim 1, wherein the controlling a position relationship between the target element and the target pointer to remain unchanged consists of:

displaying the target pointer at a first position, and displaying the target element at a second position, wherein the first position and the second position have a preset position relationship; and in a case that a display position of the target pointer is updated to a third position, updating a display position of the target element to a fourth position, wherein the third position and the fourth position have the preset position relationship; and in a case that the target element is displayed at the second position, a shape of the target element is a first preset shape; and in a case that the target element is displayed at the fourth position, a shape of the target element is a second preset shape, and the first preset shape is different from the second preset shape.

3. The time display method according to claim 1, wherein the first parameter of the electronic device comprises at least one of the following: a time zone in which the electronic device is located, a time displayed by the electronic device, a global positioning system GPS region location of the electronic device, an ambient temperature of the electronic device, a user exercise mode monitored by the electronic device, and a user exercise duration monitored by the electronic device.

4. The time display method according to claim 1, wherein the adjusting a display mode of the target pointer according to a first parameter of the electronic device comprises:

in response to that the first parameter of the electronic device comprises a time zone in which the electronic device is located, displaying the target element according to a display attribute corresponding to the time zone;

in response to that the first parameter of the electronic device comprises a user exercise mode monitored by the electronic device, displaying the target element according to a display attribute corresponding to the user exercise mode;

in response to that the first parameter of the electronic device comprises a GPS region location of the electronic device, displaying the target element according to a display attribute corresponding to the GPS region location.

5. The time display method according to claim 1, wherein the target element is a virtual humanoid control, and a display region of the virtual humanoid control is adjacent to a display region of the target pointer.

6. The time display method according to claim 5, wherein the adjusting a display mode of the target pointer according to a first parameter of the electronic device comprises:

adjusting a dressing part of the virtual humanoid control according to the first parameter of the electronic device; or adjusting a posture of the virtual humanoid control according to the first parameter of the electronic device; or adjusting a color of the virtual humanoid control according to the first parameter of the electronic device.

7. The time display method according to claim 1, wherein the display mode of the target pointer further comprises at least one of the following: a color of the target pointer, a color filling amount of the target pointer.

8. The time display method according to claim 7, wherein the adjusting a display mode of the target pointer according to a first parameter of the electronic device comprises:

in response to that the first parameter of the electronic device comprises a user exercise duration monitored by the electronic device, adjusting the color of the target pointer or the color filling amount of the target pointer according to the user exercise duration; and in response to that the first parameter of the electronic device comprises an ambient temperature of the electronic device, adjusting the color of the target pointer or the color filling amount of the target pointer according to a value of the ambient temperature.

9. An electronic device, comprising a memory, a processor, and a computer program stored in the memory and executable on the processor, wherein the processor executes the computer program to perform:

displaying a time dial, wherein the time dial comprises a target pointer; and adjusting a display mode of the target pointer according to a first parameter of the electronic device, wherein the display mode of the target pointer comprises a display attribute of a target element associated with the target pointer; and each time the target pointer moves, the target element also moves in the same direction with the target pointer;

in a process of adjusting the display attribute of the target element, controlling a position relationship between the target element and the target pointer to remain unchanged;

wherein the display attribute of the target element comprises: a form of the target element and/or a color of the target element.

10. The electronic device according to claim 9, wherein the controlling a position relationship between the target element and the target pointer to remain unchanged consists of:

displaying the target pointer at a first position, and displaying the target element at a second position, wherein the first position and the second position have a preset position relationship; and in a case that a display position of the target pointer is updated to a third position, updating a display position of the target element to a fourth position, wherein the third position and the fourth position have the preset position relationship; and in a case that the target element is displayed at the second position, a shape of the target element is a first preset shape; and in a case that the target element is displayed at the fourth position, a shape of the target element is a second preset shape, and the first preset shape is different from the second preset shape.

11. The electronic device according to claim 9, wherein the display mode of the target pointer further comprises at least one of the following: a color of the target pointer, a color filling amount of the target pointer.

12. The electronic device according to claim 9, wherein the first parameter of the electronic device comprises at least one of the following: a time zone in which the electronic device is located, a time displayed by the electronic device, a global positioning system GPS region location of the electronic device, an ambient temperature of the electronic device, a user exercise mode monitored by the electronic device, and a user exercise duration monitored by the electronic device.

13. The electronic device according to claim 9, wherein the adjusting a display mode of the target pointer according to a first parameter of the electronic device comprises:

in response to that the first parameter of the electronic device comprises a time zone in which the electronic device is located, displaying the target element according to a display attribute corresponding to the time zone;

in response to that the first parameter of the electronic device comprises a user exercise mode monitored by the electronic device, displaying the target element according to a display attribute corresponding to the user exercise mode;

in response to that the first parameter of the electronic device comprises a GPS region location of the electronic device, displaying the target element according to a display attribute corresponding to the GPS region location.

14. The electronic device according to claim 9, wherein the target element is a virtual humanoid control, and a display region of the virtual humanoid control is adjacent to a display region of the target pointer.

15. The electronic device according to claim 14, wherein the adjusting a display mode of the target pointer according to a first parameter of the electronic device comprises:

adjusting a dressing part of the virtual humanoid control according to the first parameter of the electronic device; or adjusting a posture of the virtual humanoid control according to the first parameter of the electronic device; or adjusting a color of the virtual humanoid control according to the first parameter of the electronic device.

16. A computer-readable storage medium, storing a computer program, wherein the processor executes the computer program to perform:

displaying a time dial, wherein the time dial comprises a target pointer; and adjusting a display mode of the target pointer according to a first parameter of an electronic device, wherein the display mode of the target pointer comprises a display attribute of a target element associated with the target pointer; and each time the target pointer moves, the target element also moves in the same direction with the target pointer;

in a process of adjusting the display attribute of the target element, controlling a position relationship between the target element and the target pointer to remain unchanged;

wherein the display attribute of the target element comprises: a form of the target element and/or a color of the target element.

17. The computer-readable storage medium according to claim 16, wherein the controlling a position relationship between the target element and the target pointer to remain unchanged consists of:

displaying the target pointer at a first position, and displaying the target element at a second position, wherein the first position and the second position have a preset position relationship; and in a case that a display position of the target pointer is updated to a third position, updating a display position of the target element to a fourth position, wherein the third position and the fourth position have the preset position relationship; and in a case that the target element is displayed at the second position, a shape of the target element is a first preset shape; and in a case that the target element is displayed at the fourth position, a shape of the target element is a second preset shape, and the first preset shape is different from the second preset shape.

18. The computer-readable storage medium according to claim 16, wherein the first parameter of the electronic device comprises at least one of the following: a time zone in which the electronic device is located, a time displayed by the electronic device, a global positioning system GPS region location of the electronic device, an ambient temperature of the electronic device, a user exercise mode monitored by the electronic device, and a user exercise duration monitored by the electronic device.

19. The computer-readable storage medium according to claim 16, wherein the adjusting a display mode of the target pointer according to a first parameter of the electronic device comprises:

in response to that the first parameter of the electronic device comprises a time zone in which the electronic device is located, displaying the target element according to a display attribute corresponding to the time zone;

in response to that the first parameter of the electronic device comprises a user exercise mode monitored by the electronic device, displaying the target element according to a display attribute corresponding to the user exercise mode;

in response to that the first parameter of the electronic device comprises a GPS region location of the electronic device, displaying the target element according to a display attribute corresponding to the GPS region location.

20. A computer program product, executed by at least one processor to implement the time display method according to claim 1.

* * * * *